United States Patent
Rittmann

Patent Number: 5,859,684
Date of Patent: Jan. 12, 1999

[54] EYEGLASS SUPPORT SYSTEM

[76] Inventor: Jean V. Rittmann, Apt. A303, 4700 176th St. SW., Lynnwood, Wash. 98037

[21] Appl. No.: 833,036

[22] Filed: Apr. 3, 1997

[51] Int. Cl.$^6$ ................................................. G02C 5/14
[52] U.S. Cl. .......................... 351/111; 351/41; 351/123
[58] Field of Search ................................ 351/41, 65, 66, 351/111, 123

[56] References Cited

U.S. PATENT DOCUMENTS

| | | | |
|---|---|---|---|
| 421,099 | 2/1890 | Kelley | 351/66 |
| 1,966,717 | 7/1934 | Green | 351/123 |
| 2,229,567 | 1/1941 | Hodgkins | 351/123 |
| 2,280,666 | 4/1942 | Schofield | 351/123 |
| 3,010,365 | 11/1961 | Sadel | 351/123 |
| 3,666,355 | 5/1972 | Griffith | 351/111 |
| 3,917,387 | 11/1975 | Ensing | 351/123 |
| 4,723,844 | 2/1988 | Medina | 351/111 |
| 4,886,349 | 12/1989 | Willis | 351/111 |
| 4,917,479 | 4/1990 | Bidgood | 351/123 |
| 5,162,823 | 11/1992 | Goldstein | 351/123 |
| 5,185,620 | 2/1993 | Cooper | 351/52 |
| 5,347,325 | 9/1994 | Lei | 351/118 |
| 5,440,356 | 8/1995 | Fukuwa | 351/123 |

*Primary Examiner*—Huy Mai

[57] ABSTRACT

An eyeglass support system, where, when worn, lenses (55a unseen and 56a) and frame (59a) are lifted onto a wearer's nose by leveraging the rearward ends of sidepieces (47a unseen and 48a) under the lower rear slopes of the wearer's ears. The weight of the lenses plus frame is slightly forward of where the eyeglasses' nosepiece (46c) rests on the wearer's nose. The two sidepieces are mounted to the outside edges of the eyeglasses. The free ends of the sidepieces have ear-rests (51a and unseen 52a), which rest under the lower rear slopes of the wearer's ears. The side pieces supported under the ears, leverage the weight of the glasses up on the nose. The ear-rests hold the nosepiece to the nose at a desired position. This hold is secure because the slopes of the nose and lower rear ears are somewhat parallel.

9 Claims, 7 Drawing Sheets

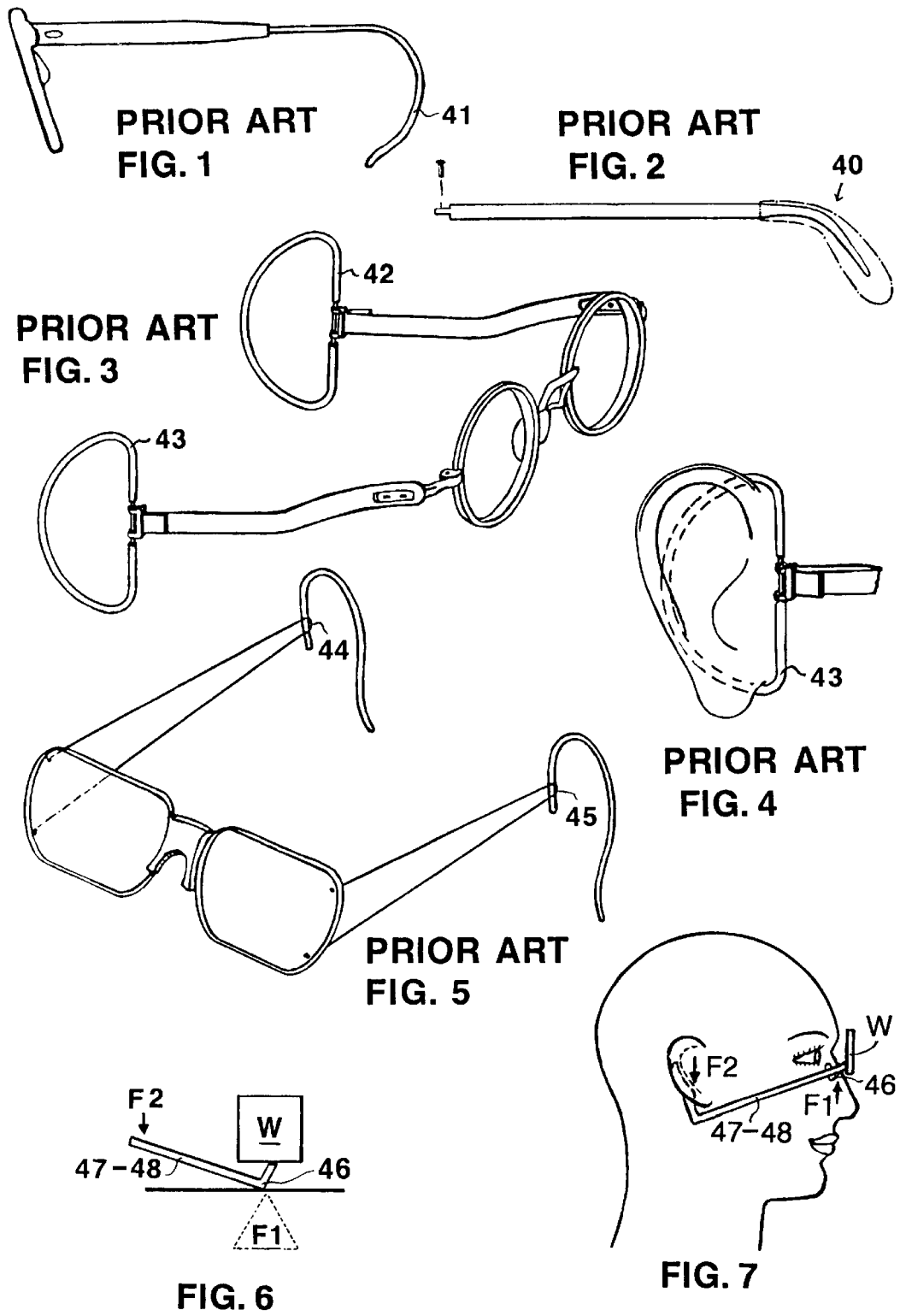

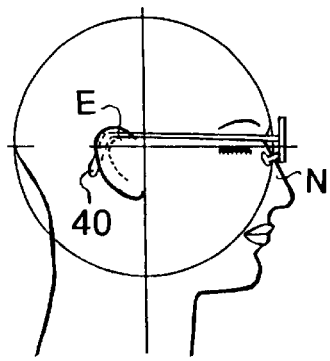
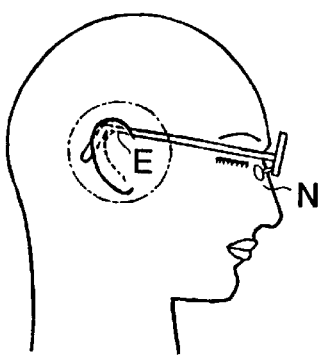
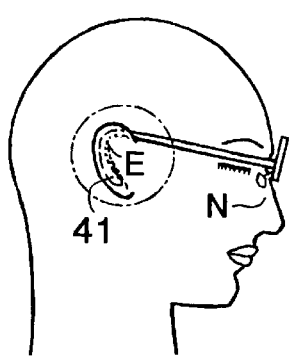
PRIOR ART FIG. 8A     PRIOR ART FIG. 10A     PRIOR ART FIG. 11A
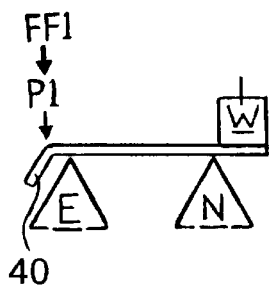
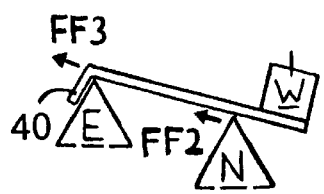
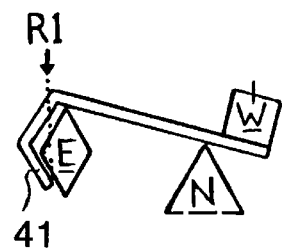
FIG. 8B     FIG. 10B     FIG. 11B
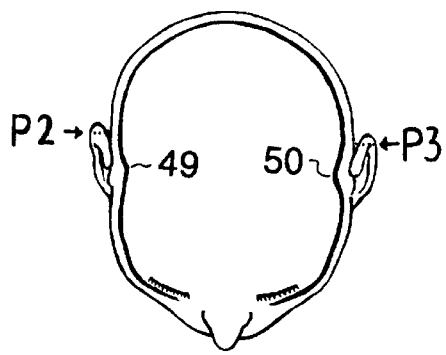
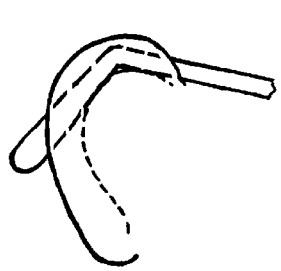
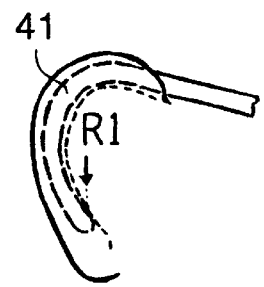
FIG. 9     FIG. 10C     FIG. 11C

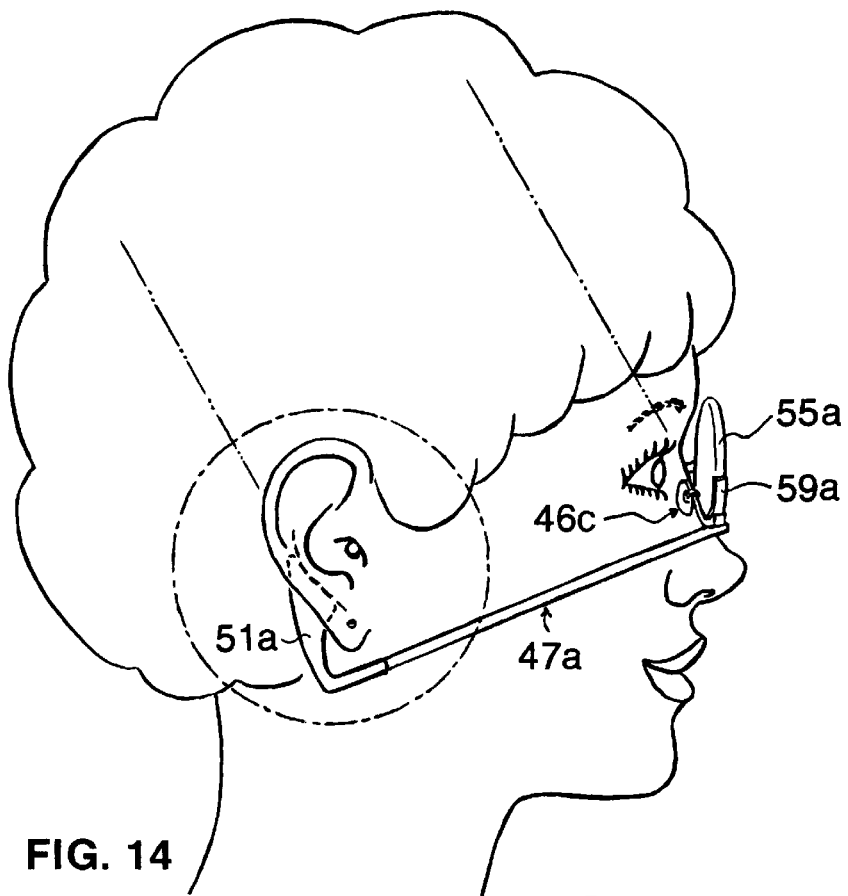
FIG. 14
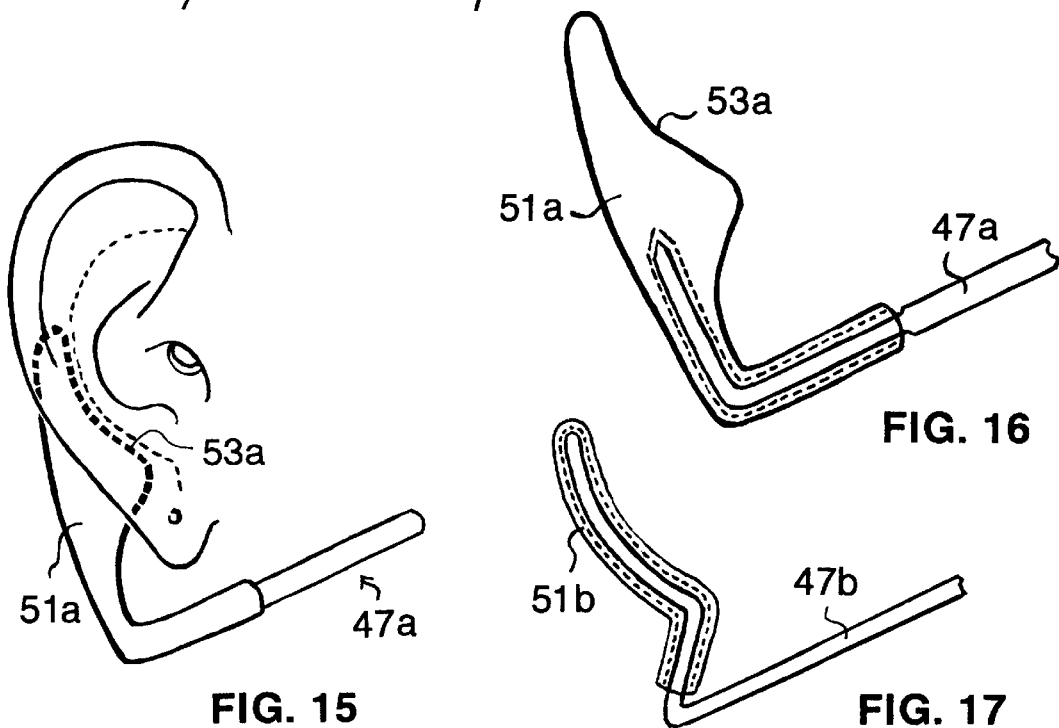
FIG. 15
FIG. 16
FIG. 17

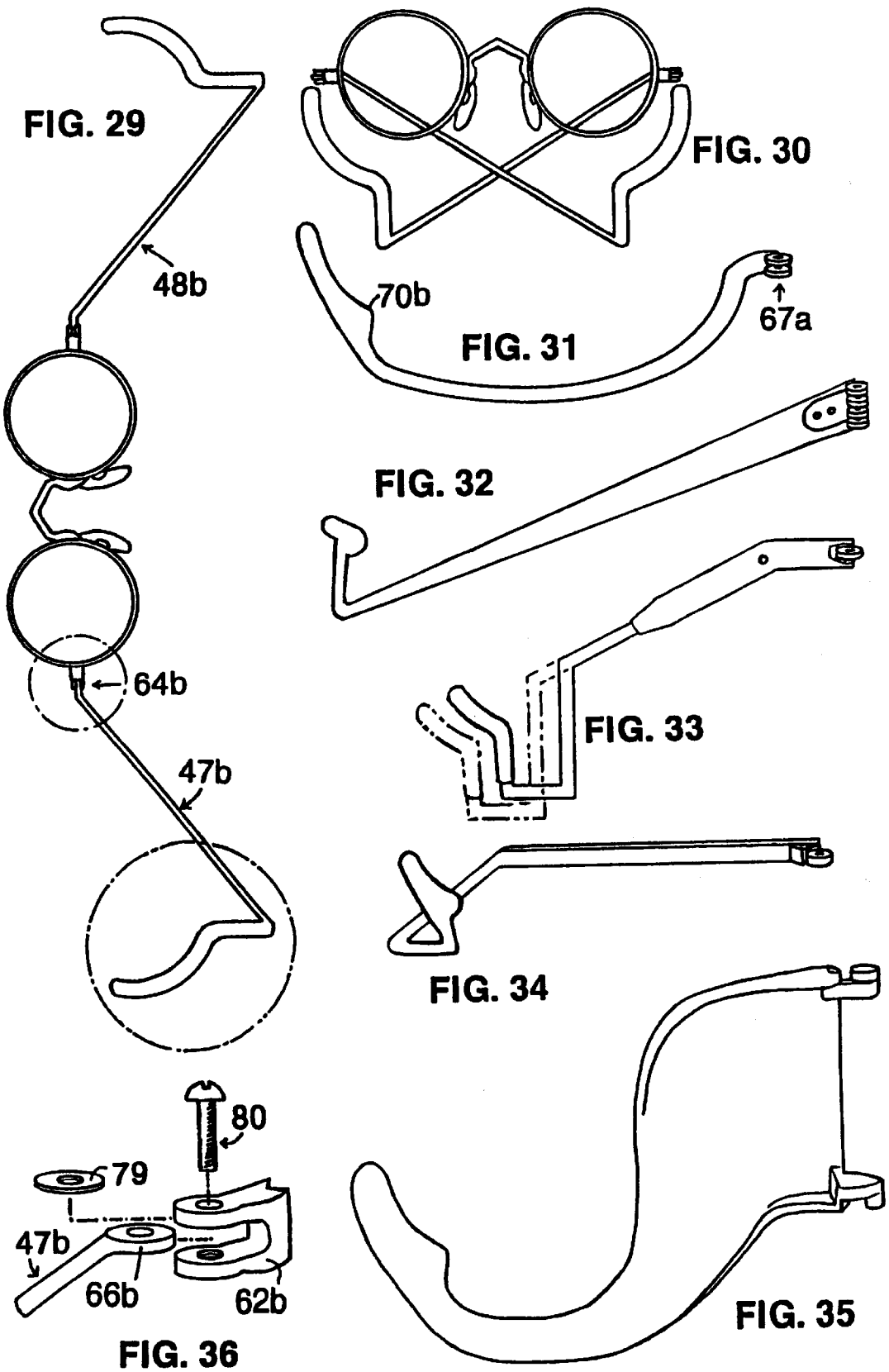

EYEGLASS SUPPORT SYSTEM

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF INVENTION

This invention relates to spectacles and eyeglasses. More specifically, eyeglasses that are supported on the wearer's nose by resting the sidepieces underneath the wearer's ears, producing improved comfort and no slippage down the wearer's nose.

Eyeglasses up till now have the tendency to slip down the nose, hurt where the temples grab behind the ears, or hurt where the temples act together as a vise to press against the wearer's head. The tendency for the eyeglasses to slip down the nose is increased when the wearer bows forward, which is a common position. The temple design does not hold eyeglasses in place when the wearer's skin becomes oily or wet, which is one reason why head straps are used for sports.

Heretofore the following have been used: lightweight lenses and frames; frames where the lenses' weight is centered directly over the nosepiece; nosepiece pads, attachments, or altered construction; earpiece pads, attachments, or altered construction; temple pads, attachments, or altered construction; altered hinge designs; and around the head straps.

Prior art, like that in U.S. Pat. No. 4,917,479 by William T. Bidgood, granted Apr. 17, 1990, entitled ADJUSTABLE COUNTERWEIGHTED TEMPLE PIECES FOR EYEGLASSES, provides an embodiment of a common form fit temple, shown in FIG. 2. In a form fit temple eyeglass support system, the pair of temples press together against a wearer's head. This pressure creates friction against the wearer's head. Friction is the means of support for eyeglasses using form fit temples. This friction support is greatly reduced when the wearer's skin becomes oily. With less friction, the eyeglasses start to slide down the slope of the wearer's nose. Form fit temple hook 40 does not hold eyeglasses to the wearer's ear, as might be presumed. When the eyeglasses slide forward, temple pressure pushes the hooks into the ears, which can hurt.

Prior art, like that in U.S. Pat. No. 3,666,355 by A. G. Griffith, granted May 30, 1972, entitled EYEGLASS TEMPLE, shown in FIG. 1, provides an embodiment of common cable temple, with cable earpiece 41. Like form fit temples, cable temples also depend on the friction to the wearer's head. Cable earpieces also try to hold eyeglasses on a wearer's face by gripping more of the base curves of the ears. The ends of these temples can press, quite painfully, on the undersides of the wearer's ears and ear lobes.

Prior art, like that in U.S. Pat. No. 5,162,823 by Ronald S. Goldstein, granted Nov. 10, 1992, entitled EYEGLASS TEMPLES HAVING ADJUSTABLE "D" SHAPED EAR PIECE ELEMENTS, is shown in FIG. 3 and detail FIG. 4. The "D" earpieces 42 and 43 pull the full weight of the eyeglasses to a wearer's head with the rear slopes of the wearer's ears. The flexibility of the earpieces allow the earpieces to squeeze against the wearer's sensitive ear lobe bases and uppermost ear edges.

Prior art, like that in U.S. Pat. No. 4,723,844 by George Medina, granted Feb. 9, 1988, entitled EYEGLASSES, shown in FIG. 5, attaches eyeglasses to earpieces by means of suspension lines. This system also pulls the full weight of the glasses to the head with the earpieces pressed against the full rear slopes of the wearer's ears. Functionally, if the suspension line attachment area on the earpieces at 44 and 45 are not at a perfect height for a wearer, earpieces can either slip forward off the ears or tilt back and press against the wearer's lower rear ear slopes and sensitive ear lobes.

Prior art, like that in U.S. Pat. No. 5,440,356 by Yasuo Fukuwa, granted Aug. 8, 1995, entitled SPECTACLE FRAME INCLUDING SELF-ALIGNING TEMPLE END PIECE, is an eyeglass system with pivotal earpieces. Because these earpieces contact the upper ear slopes, any contact to the lower ear slopes will cause great force against those lower slopes. Production models of this prior art have full contact over the ears.

With all the above mentioned eyeglass systems, the nosepieces provide an additional friction support against the wearer's nose. This support diminishes when the wearer's nose is oily, wet, lotioned, or coated with makeup.

BRIEF SUMMARY OF THE INVENTION

This invention is an eyeglass support system, where eyeglasses are lifted on a wearer's nose by leveraging the rearward ends of a pair of elongated sidepieces under the lower rear slopes of the wearer's ears. The weight of the eyeglasses is slightly forward of where the eyeglasses' nosepiece rests on the wearer's nose. The frontward ends of the sidepieces are mounted on the peripheral edges of the eyeglass frame. The rearward ends of the sidepieces curve upward. The insides of these curves are worn under the lower rear slopes of the wearer's ears.

The curves hold down the sidepieces. The sidepieces leverage the weight of the glasses up onto the wearer's nose. The curves against the ears also hold the nosepiece to the nose at a desired position.

All of the eyeglass weight is positioned on the wearer's nose. A minor counterbalance force presses up against the lower rear slopes of the wearer's ears. This system is much like FIG. 6, which depicts a weight W lifted from a surface F1 with crowbar-like lever 47–48: comparatively little force F2 is needed to hold down the longer lever arm when the shorter lever arm is wedged under the weight.

Referring to both FIG. 6 and FIG. 7, the sidepieces of my eyeglasses are depicted as lever 47–48: lifting the weight W of the glasses from the surface F1 of the nose, by way of a nosepiece 46, using the longer arm of the lever held under a wearer's ears F2.

ADVANTAGES OF THE INVENTION

My system remedies the disadvantages of prior art by effectively lifting and supporting the eyeglasses on a wearer's nose so they will not slip down. My system puts almost no pressure on the wearer's ears. My system also does not need to painfully press against the wearer's head. The full weight of the eyeglasses is not pulled to the wearer's head with the rears of the wearer's ears, therein no pain from such force. No friction forces are required, therein eyeglasses will not slip when the wearer's skin becomes oily or lubricated. When fitted properly, there is no painful contact to a wearer's ears. Heavy lenses do not promote slippage. My system can allow unobstructed peripheral vision. The simple construction of my system allows the wearer to put on and take off the eyeglasses as easily as prior art form fit temple eyeglasses. With my system eyeglasses will not shift from position, even if the wearer summersaults forward. My system provides a more secure and painless method of attachment because: less is more, or avoiding contact to the tops of a wearer's ears produces a better result.

BRIEF DESCRIPTION OF THE DRAWINGS

FIG. 1 is an eyeglasses embodiment with conventional cable temples.

FIG. 2 is a conventional form fit temple.

FIG. 3 is Prior Art shown in Pat. No. 5,162,823.

FIG. 4 is a detail of Pat. No. 5,162,823 on a wearer's right hand side ear.

FIG. 5 is Prior Art shown in Pat. No. 4,723,844.

FIG. 6 is a diagram of a weight being leveraged.

FIG. 7 is a representation of both sides of a wearer wearing my eyeglass system, right hand side view.

FIG. 8A is a representation of a prior art form fit temple eyeglass system on a wearer, right hand side view.

FIG. 8B is a force diagram of FIG. 8A.

FIG. 9 is a potential wearer's head, top view.

FIG. 10A is a representation of a prior art form fit temple eyeglass system on a wearer with a bowed head, right hand side view.

FIG. 10B is a force diagram of FIG. 10A.

FIG. 10C is a detail of the ear portion of FIG. 10A.

FIG. 11A is a representation of a prior art cable temple eyeglass system on a wearer with a bowed head, right hand side view.

FIG. 11B is a force diagram of FIG. 11A.

FIG. 11C is a detail of the ear portion of FIG. 11A.

FIG. 14 is the embodiment in FIG. 12 on a wearer, right hand side view.

FIG. 15 is a detail on the ear portion of FIG. 14.

FIG. 16 is a detail on the ear-rest of FIG. 14.

FIG. 17 is a detail on the ear-rest of FIG. 29.

FIG. 29 is a prior art sunglass frame retrofitted with my sidepieces, layed open, front view.

FIG. 30 is the embodiment of FIG. 29, layed closed, front view.

FIG. 31 is an embodiment of my retrofit left hand sidepiece, side perspective view, for the prior art eyeglass frame in FIG. 23.

FIG. 32 is an embodiment of my retrofit left hand sidepiece, side perspective view, for the prior art eyeglass frame in FIG. 24.

FIG. 33 is an embodiment of my retrofit left hand sidepiece, side perspective view, for the prior art eyeglass frame in FIG. 25.

FIG. 34 is an embodiment of my retrofit left hand sidepiece, side perspective view, for the prior art eyeglass frame in FIG. 27.

FIG. 35 is an embodiment of my retrofit left hand sidepiece, side perspective view, for the prior art eyeglass frame in FIG. 28.

FIG. 36 is a detail of FIG. 29: an embodiment of a retrofit vertical pin hinge assembly for my sidepieces to mount to prior art eyeglasses, side perspective view.

Figure 12:
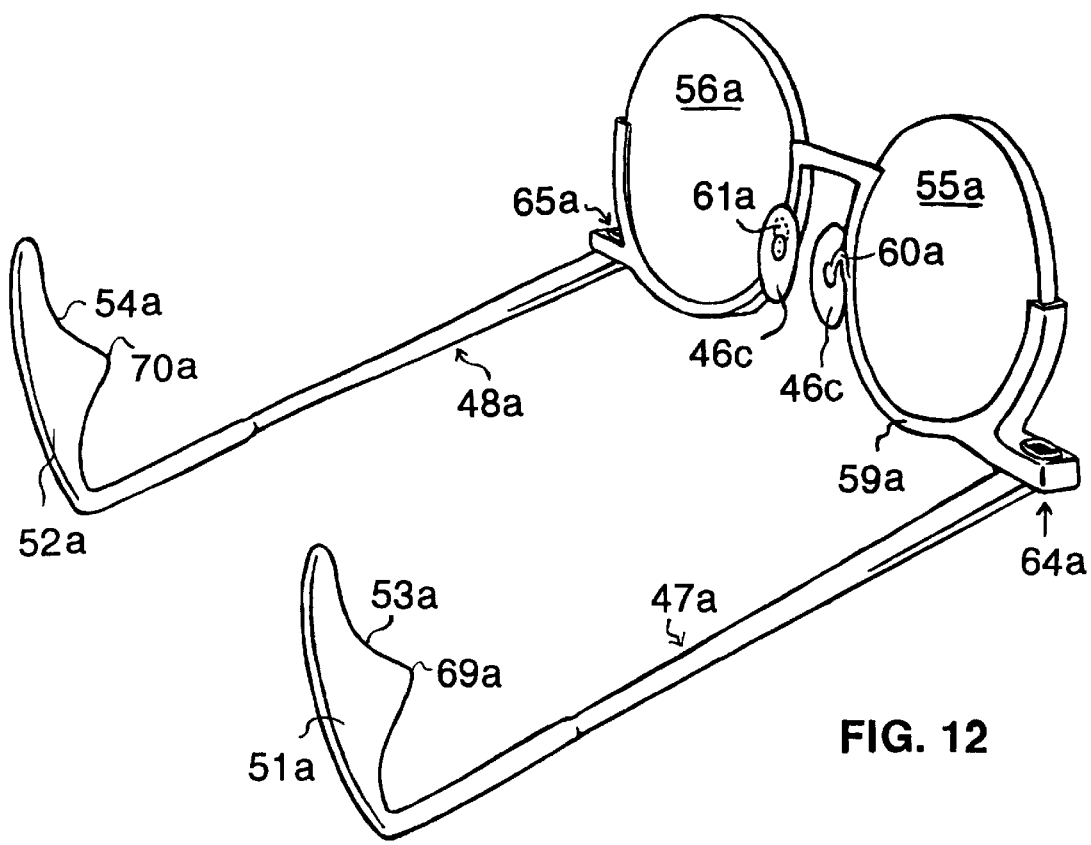
FIG. 12 is a right hand side rear perspective view showing one embodiment of my eyeglass system.

DESCRIPTION OF THE NOTATIONS 40 prior art: form fit temple hook
41 prior art: cable earpiece
42 prior art: left hand side "D" earpiece
43 prior art: right hand side "D" earpiece
44 prior art: right hand side line attachment area of earpiece
45 prior art: left hand side line attachment area of earpiece
46 nosepiece
46a prior art: insertable nosepads with pad arms nosepiece
46b prior art: large flanges nosepiece
46c prior art: adjustable nosepads nosepiece
46e prior art: saddle bridge nosepiece
46f prior art: unifit nosepiece
46i safety glasses' nosepiece
47–8 a representation of: a lever (as my eyeglasses' sidepieces)
47 a right hand side sidepiece of my eyeglass system
48 a left hand side sidepiece of my eyeglass system
49 right hand side skull indentation
50 left hand side skull indentation
51 right hand side ear-rest
52 left hand side ear-rest
53 curve of ear-rest 51
54 curve of ear-rest 52
55a prior art: right hand side optical lens
56a prior art: left hand side optical lens
59 eyeglass frame
60 right hand side pad arm
61 left hand side pad arm
62 right hand side half hinge (often barrels): on an eyeglass frame
63 left hand side half hinge (often barrels): on an eyeglass frame
64 right hand side vertical axis hinge
65 left hand side vertical axis hinge
66 my right hand side sidepiece's half hinge
67 my left hand side sidepiece's half hinge
68 peripherally arcked sidepiece as alteration of sidepiece 47
69 right hand side ear nub of curve 53
70 left hand side ear nub of curve 54

71 possible symmetrical contact area to rest a nosepiece
72 prior art: base of an ear
73 prior art: ear lobe
74 prior art: midpoint of an ear base slope
79 spacing washer
80 prior art: hinge screw
89 prior art: eyeglass stop
W weight of eyeglasses (frame and lenses)
FF1 friction force from temple pressure P2 and P3
FF2 friction force to a nose
FF3 friction force behind the ears
F1 nose fulcrum (surface of the nose)
F2 comparatively small force required to support W on F1
E ears (ear fulcrums): for prior art
N nose (nose fulcrum): for prior art
P1 distributed weight of prior art temple hooks behind the ears
P2 right hand side prior art temple pressure to a wearer's head
P3 left hand side prior art temple pressure to a wearer's head
P4 sidepiece weight behind the wearer's nose (distributed load)
L1 my sidepieces' length from the nose to the ears
L2 distance from the wearer's nose to the middle of eyeglass weight
R1 ear reaction (force): for prior art
R2 ear reaction (force): for my eyeglasses
Ø an angle an an ear-rest bends peripherally (a typical 10 degrees)

DETAILED DESCRIPTION OF THE INVENTION

1. Force Analogy of Prior Art Eyeglasses with Temples

Eyeglass temples are elongated members that fit against the wearer's temples and over the ears. The areas of the wearer's face where the eyeglasses sit are considered fulcrums. As shown in FIGS. 8A and force diagram 8B, eyeglasses with temples provide multiple fulcrums on the wearer's face: at the nose N and the top of the ears E. The weight of the glasses (W in FIG. 8B) is in front of the nose N. The only temple weight behind the ears E is the comparatively tiny distributed weight P1 of the temple hooks behind the ears. The forces are similar to laying a pencil over a coffee cup, so the pencil rests on the cup at two points, then hanging some keys on one end of the pencil: the pencil represents the temples, the keys represent the eyeglasses' weight, and the cup edges represent the fulcrums of the nose N and the pair of ears E. Once one lets go of the free end of the pencil, the pencil and keys fall forward. This unbalanced weight design is not stable in and of itself.

Eyeglasses with temples are mostly held to the wearer by having the rear ends of the temples press against the wearer's head. This pressure, shown in FIG. 9 as P2 and P3, is like two fingers gripping together to hold a drinking glass. Pressing laterally on the head provides absolutely no support for the weight of the glasses if not for the friction force. When the wearer's head becomes oily or lubricated, this grip slips. It slips like the drinking glass would slip from between the fingers if they were oily. Pressure P2 and P3 help produce friction force FF1.

FIG. 8B diagrams the forces acting to keep the eyeglasses in place with a wearer's head in the level position. The combined friction forces FF1 and weight of the temples P1 behind the wearer's ears is approximately the weight force of the eyeglasses W. In other words, FF1+P1≈W. Since the temple hook weight behind the ears is commonly insignificant, FF1≈W. In other words, friction almost entirely supports the eyeglass weight.

The form fit temple hooks actually do not help hold the eyeglasses up by hooking on the ears. To test this, one can try wearing form fit temples on the outer surfaces of the ears: The eyeglasses will stay in place, but the pressure to the outsides of the ears will commonly be quite uncomfortable.

The function of the form fit hooks is to provide an extended surface area for friction behind the ear. Temple ends are not often straight back from the ears, in part, because of the slopes of the human skull. In FIG. 9, the skull indentations 49 and 50 at the center point of the ears help push the temples forward off the nose. It is these indentations that help push the temple hooks against the rears of a wearer's ears.

FIGS. 10A, B, and C, all represent a form fit temple eyeglass support system on a wearer, where the wearer's head is bowed. In FIG. 10B, the eyeglass weight W is like on a downward slope of a hill: from the ears E to the nose N. The friction force FF3 behind the ears, along with the friction force of the nosepiece against the nose FF2, are mainly the only forces to stop the eyeglasses from slipping forward. Because an eyeglass nosepiece commonly has a smooth surface, as do temple hooks, just a little bit of oil or lubrication on the wearer's skin can allow the eyeglasses to slip forward.

Because the temple eyeglass system is dependent on friction, there is nothing to permanently keep eyeglasses from slipping forward. The most common prior art attempted solution has been to reduce the eyeglass' weight.

In FIGS. 11A, B, and C, cable earpieces 41 curve around to the underside of the ears for more presumed support. These cable temples grab to the rears of the wearer's ears E to help pull the weight of the glasses W to the wearer's nose N. The disadvantage of this is that cable temple contact to the lower rear slopes of the ears causes a significant reaction force R1 to those lower rear slopes. This is because contact over the ears makes this system act like a lever in reverse, where the heavy glass weight is on the long arm of the lever. Without friction, the ear reaction R1 would, of average, be eight times greater than the eyeglass weight. If the ends of these cables rest on the sensitive ear lobes, the pressure up on the ear lobes can be painful.

The exact amount of pressure on the underears depends on eyeglass weight, cable flexibility, temple friction to the wearer, and how the cable temples are worn. Cable temples are much less common than form fit temples; perhaps, in part, because they can be so painful.

The above example shows why attachment to the wearer's upper and lower ear slopes can produce pain and not improve the quality of attachment. Discussed prior art U.S. Pat. No. 5,162,823, U.S. Pat. No. 4,723,844, and U.S. Pat. No. 5,440,356 also provide for upper and lower ear slope attachment. Therein, they all can be potentially painful.

2. Description of One Embodiment of the Invention

FIG. 12 shows an embodiment of my eyeglasses, Eyeglass Support System. In this embodiment, my right and left hand side sidepieces 47a and 48a are mounted to the most peripheral, lower, corresponding edges of eyeglass frame 59a. The mounting is by way of corresponding vertical axis hinges 64a and 65a. The hinges allow my sidepieces to lay flat with the frame for storage.

Each ear-rest 51a and 52a, is fixedly attached to the rearward end of corresponding sidepieces 47a and 48a respectively. Ear-rest curves 53a and 54a are the frontward upper edges of ear-rests 51a and 52a respectively. The lowest portions of the ear-rest curves 53a and 54a are nubs 69a and 70a respectively.

Provided prior art optical lenses 55a and 56a are shown fixedly attached to frame 59a. Nosepiece 46c is a pair of adjustable nosepads, and is centrally located on frame 59a. The nosepiece pads are attached to pad arms 60a and 61a. The pad arms are a fixedly attached part of the frame. Nosepiece 46c is positioned rearward of the frame.

3. One Embodiment of the Invention on a Wearer

The Eyeglass Support System shown in FIG. 12, is shown on a wearer in FIG. 14. Because FIG. 14 is a right hand side profile view, only the right hand side of my eyeglass system is visible. A left hand side profile view is the same as the right hand side profile view, except opposite hand.

The optical lenses 55a (and unseen 56a), supported by eyeglass frame 59a, are positioned in front of the wearer's eyes. My sidepieces 47a (and unseen 48a), are mounted to the frame, and positioned laterally from the wearer's face below the line of sight. The embodiment attaches to the wearer by way of the pads of nosepiece 46c (half unseen) and ear-rests 51a (and unseen 52a). The nosepiece is received onto both sides of the wearer's nose. Each ear-rest is received by the wearer's corresponding lower rear ear slope.

FIG. 15 is a detail of the ear-rest 51a on sidepiece 47a. This detail shows how my eyeglasses' ear-rest curve 53a is received on the lower rear slope of the wearer's ear.

FIG. 16 is a detail of the ear-rest of FIG. 14. Ear-rest 51a with curve 53a is shown in this embodiment as a fixedly attached cover for sidepiece 47a.

4. Notations of the Invention

Similar parts of different embodiments of my system are numbered the same, and distinguished with small letters after a notation number. Examples of this are as follows. All nosepieces are 46, all left hand sidepieces are 48, all right hand ear-rests are 51, and so on. Different embodiments of nosepieces are 46a, 46b, 46c, and so on.

Left hand side parts of my system are the same as right hand side parts of my eyeglasses, except opposite hand. Both hand side pieces together are considered a pair.

5. Prior Art Notations

Figure 20:
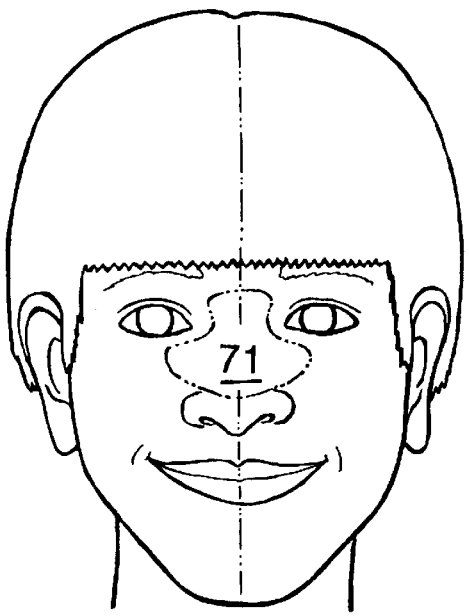
FIG. 20 is a front view of a potential wearer, potential symmetrical nosepiece contact area indicated.

FIG. 20, showing a front view of a potential wearer, indicates the possible symmetrical contact area 71 of a nosepiece. This area is referred to in this text as the nose.

Figure 21:
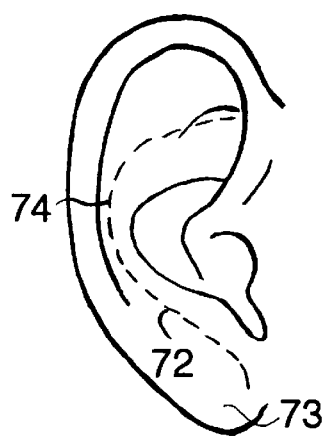
FIG. 21 is a side view of a right hand side human ear.
Figure 22:
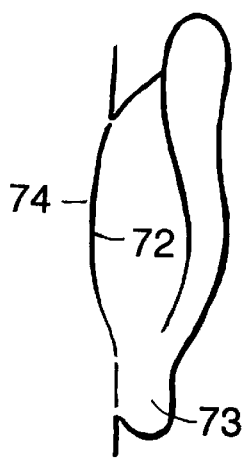
FIG. 22 is a rear view of a right hand side human ear.

FIG. 21 and FIG. 22 show a right hand side human ear. A left hand side ear is the same as a right hand side ear except opposite hand. The base of the ear is notated as 72, and the ear lobe as 73. The midpoint of the ear base slope is notated as 74. Below midpoint 74 is considered the lower rear slope of the ear.

6. Securing the Invention on a Wearer

All embodiments of my system fasten to a wearer by means of a gentle hold against the wearer's nose and the lower rear slopes of the wearer's ears by the nosepiece (46) and the ear-rests (53 and 54). This gentle hold provides a secure attachment of my eyeglasses to the wearer. Ear-rests, or sidepieces, may be bent to draw the nosepieces to the desired position on the wearer's nose. Pad arms, when part of an embodiment, are adjusted so the nosepieces fit around the wearer's nose in the common prior art way: by bending pad arms. Ear-rests may be bent frontward or rearward. Sidepieces may be bent upward or downward. Proper bending for a correct fit may be accomplished similarly to prior art form fit temple bending: by an optical goods retailer.

Incorrect eyeglass fitting is indicated when: the bottom or top of the eyeglass frame tilts forward, pressure is felt on the back of the ears, the ear-rest curve nubs contact the ear lobes, or the nubs are not positioned near the lower portions of the rear ear slopes. When adjusted properly, the ear-rests usually can not be felt at all by the wearer.

Notice the parallel phantom lines shown in FIG. 14. Commonly, a wearer's lower rear ear slopes are somewhat parallel to the wearer's nose slope. The phantom parallel lines shown are tangential extensions from those slopes. The nose and lower rear ear slopes provide opposing, virtually parallel, surfaces for a secure hold to the wearer's head.

The multiple curvatures of a wearer's nose and ears provide surfaces that securely confine the position of a hold. The bases of the lower rear ear slopes provide the most secure locations to rest the ear-rest curves. From these ear bases, the ears curve both vertically and horizontally: vertically around the base of the ears, and horizontally, as the ear base is a valley between the back of the wearer's head and the rearward extension of the external ears. The wearer's nose curves horizontally down the two sides of the nose. A symmetrical nosepiece provides some sideways eyeglass frame stability, both for my system and for prior art eyeglasses. The combined confining curvatures secure the eyeglasses to the wearer in any position.

7. Force Analogy of the Invention on a Wearer

Figure 18A:
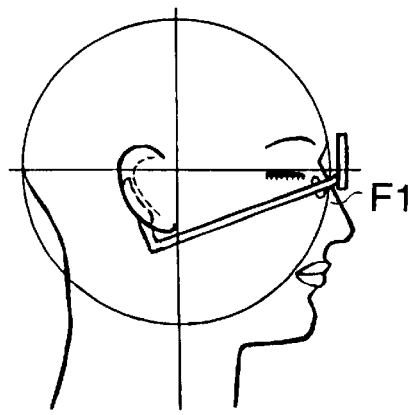
FIG. 18A is a representation of my eyeglass system on a wearer, right hand side view.
Figure 18B:
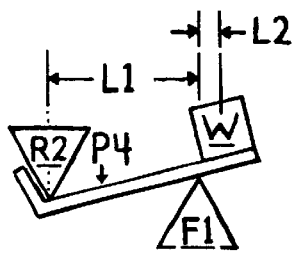
FIG. 18B is a force diagram of FIG. 18A.

The representation of my eyeglass system on a wearer in FIG. 18A is shown as a force diagram in FIG. 18B. The eyeglass' weight W is upwardly supported only by the wearer's nose. The nose, considered a fulcrum, is notated as F1. The wearer's ear reaction is notated as R2, my sidepieces' length from the nose to the ears as L1, the distance from the wearer's nose to the middle of eyeglass weight as L2, and the sidepiece weight behind the wearer's nose as distributed load P4.

Using the formula for a lever moment: $F1 = W \times L2 = R2 \times L1 + P4$. Of an average embodiment, $L2 = 14$ mm, and $L1 = 115$ mm. Therefore, $R2 \approx \frac{1}{8} W - (P4 \div 115$ mm.) This basically means, with an average embodiment, each of the wearer's ears feels less than one sixteenth the weight of the eyeglasses (R2 is both ears). Because this force under the wearer's ears is so small, each sidepiece with ear-rest should be light in weight, such that the force under the wearer's ears is not less than zero.

This leveraging is effective because ear-rest curves do not contact the upper rear slopes of the wearer's ears. Because the eyeglass weight W is leveraged onto the wearer's nose, eyeglass weight must be positioned in front of, and not directly over, the wearer's nose.

Figure 19A:
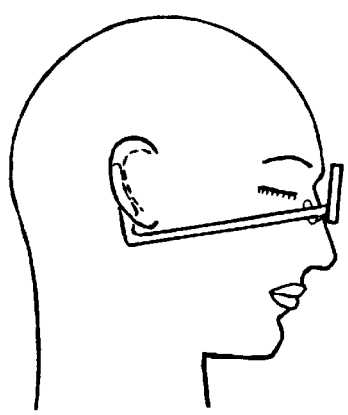
FIG. 19A is a representation of my eyeglass system on a wearer with a bowed head, right hand side view.
Figure 19B:
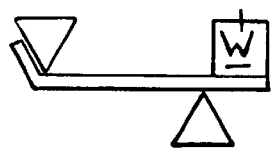
FIG. 19B is a simplified diagram of FIG. 19A.

FIG. 19A shows a representation of my system on a wearer with a bowed head. FIG. 19B shows a simplified diagram of FIG. 19A. The diagram, similar to FIG. 18B, pictorially shows that leveraging eyeglass weight W is effective when a wearer's head is bowed.

8. Common Specifications of the Invention

Ear-rest nubs may be an average 20 mm. above the rear ends of the sidepieces, to avoid contact with the wearer's ear lobes and to provide room for ear rings. Ear-rests can rest back from the ear lobes.

Figure 13:
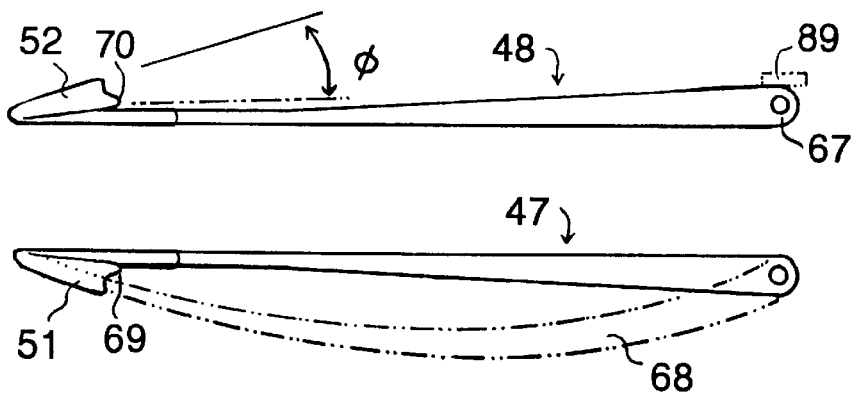
FIG. 13 is a top view representation of a pair of my sidepieces.

As shown in FIG. 13, ear-rests 51 and 52 may be bent peripherally, at an angle Ø, a typical ten degrees (0.1745 radians), as indicated on sidepiece 48, to provide continuous contact with the base curvatures of the wearer's lower rear ear bases. This bend, or angle, can start at the ear-rest nubs 70 (and 69 for sidepiece 47).

My sidepieces may be arced sideways, similar to phantom peripherally arced sidepiece 68, which is shown as an alteration of sidepiece 47. This arc may provide added room for a wearer's cheeks when a frame is too narrow for the wearer's face.

Prior art eyeglass stops brace prior art temples against the eyeglass frame for pressure to a wearer's head. These stops also provide some sideways stability for the frame. Prior art stops like 89, near half hinge barrel 67 on sidepiece 48, may be used on my system for added sideways stability.

Ear-rests may be thin, or be of a variable width to accommodate a wearer's ears. My sidepieces may be thin, or be of a variable width to accommodate a wearer's face.

9. Embodiments of the Invention Using Prior Art a. prior art nosepieces

All nosepieces should be of a size and shape to be received onto a wearer's nose. FIGS. 23–28 display a variety of prior art nosepieces. Suitable prior art nosepieces for my system are common adjustable nosepads nosepiece 46c in FIG. 26, saddle bridge nosepiece 46e in FIG. 27, and insertable nosepads with pad arms nosepiece 46a in FIG. 23. Unifit nosepiece 46f in FIG. 25, large flanges nosepiece 46b in FIG. 24, safety glasses' nosepiece 46i in FIG. 28, and any other nosepieces are suitable if they can rest on a wearer's nose to the rear of the weight of the accompanying eyeglass frame with lenses.

Figure 23:
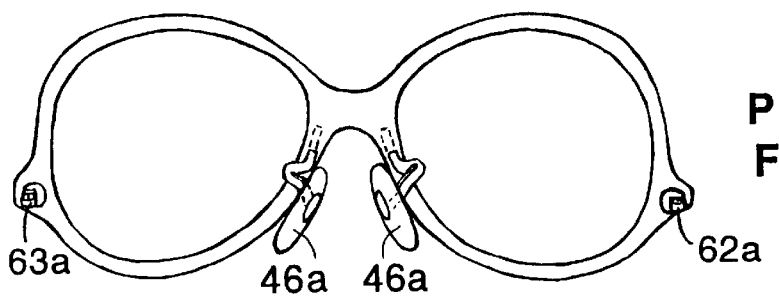
FIG. 23 is a prior art plastic frame with shallow nosepiece flanges, and added nosepiece, rear perspective view.

For my system, frames with small nose flanges, like that of FIG. 23, require rearward added nosepieces like insertable nosepads with pad arms nosepiece 46a.

About 95% of frames sold currently (in 1997) are metal frames with rearward nosepieces. The prior art advantages of rearward nosepieces is that they help the frame clear, or rest above, a wearer's cheeks, and help keep the eyeglasses from fogging up.

b. prior art frames, my sidepieces, and mounting

My sidepieces may be retrofitted to most prior art frames, including those shown in FIGS. 23–28. Suitable embodiments of my retrofit left hand sidepieces, of equal dimensioning, are shown in FIGS. 31–35. My sidepieces include, but are not limited to, the sidepiece configurations shown.

FIG. 31 sidepiece retrofits, by way of half hinge 67a to the eyeglass frame in FIG. 23, by way of half hinge 63a. FIG. 32 sidepiece retrofits similarly to the frame in FIG. 24, FIG. 33 sidepiece retrofits similarly to the frame in FIG. 25, and FIG. 34 sidepiece retrofits similarly to the frame in FIG. 27. The sidepieces 47b and 48b, shown with another prior art frame in FIG. 29, are suitable for the frame in FIG. 26. All these embodiments of my sidepieces can be secured to a frame with prior art hinge screws. Vertical axis hinges, using barrels and hinge screws, are the most common prior art hinges.

My sidepieces may be lengthened or shortened in any number of prior art ways, as shown in FIG. 33. Previously noted prior art U.S. Pat. No. 3,666,355 by A. G. Griffith, granted May 30, 1972, entitled EYEGLASS TEMPLE is one mechanism of changing temple length.

Prior art nosepiece pads and pad arms with screws (46c of FIG. 26) provide minimal rotational play to accommodate a wearer's nose. My sidepieces may provide similar minimal rotational play to accommodate a wearer's lower ear base slopes (the play allows Ø of FIG. 13 to vary). Prior art methods of lengthening temples, like the EYEGLASS TEMPLE by A. G. Griffith, may provide this minimal rotational play.

The elongated portion of the sidepiece shown in FIG. 34, when worn, may extend (without touching) above the surface of a wearer's ear. The sidepiece then may bend inwards under the ear, terminating in an ear rest. Again, only the ear rest of the sidepiece touches the wearer.

Figure 28:
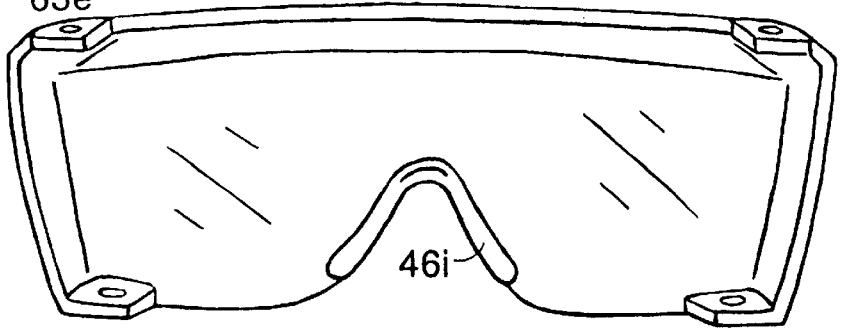
FIG. 28 is a pair of prior art safety glasses with frame, rear perspective view.

FIG. 35 sidepiece retrofits to the safety eyeglass frame in FIG. 28. Instead of hinge screws, the safety glass frame in FIG. 28 has wider spaced vertical axis barrel hinges. FIG. 35 sidepiece provides a pair of vertical pegs to secure the sidepiece to the frame.

Uncommon fold hinges could also be used, like those of some disposable 3-D eyewear (not shown).

An embodiment of my sidepieces, mounted on a prior art sunglass frame, are shown in FIGS. 29–30. FIG. 29 is the embodiment layed open, front view. FIG. 30 is the same embodiment layed closed, front view.

FIG. 17, a detail of FIG. 29, shows an embodiment of ear-rest 51b as a fixedly attached cover for sidepiece 47b.

All ear rests of my sidepieces are of a size and shape to receive the lower rear slope of a corresponding wearer's ear. Right hand side sidepieces are the same as left hand side side pieces, except opposite hand.

FIG. 36 is an embodiment of the retrofit hinge assembly 64b of FIG. 29. Right hand side sidepiece 47b is mounted, by way of half hinge barrel 66b, to frame half hinge barrels 62b by hinge screw 80. Spacing washer 79 may be inserted to provide a tight, vertically immobile, hinge.

For my system, most types of eyeglass frames may be used including, but not limited to, metal, rimless, plastic, sunglass, safety, half eyes (not shown), and sports eyewear (not shown).

10. Distinguishing Characteristics of the Invention

My sidepieces with ear-rests are distinguishable from upside down prior art form fit temples by two characteristics: form fit temples commonly have a shorter tip-to-end length, and the inside edge of the temple hook is continuously smooth.

Many examples of common prior art frames, just prior to my system, can be seen in FRAMES catalogs. A recent issue is FRAMES, published by Frames Data Inc., 1996, Volume 100 Spring/Volume XXX1/Number 31 (about 1300 pages). Over 20,000 eyeglass support systems (frames with temples) are shown.

Figure 27:
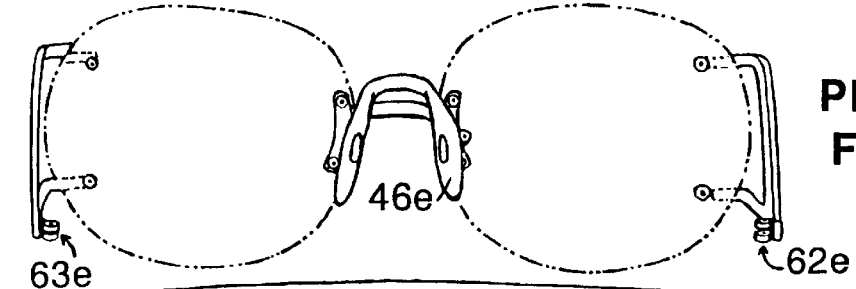
FIG. 27 is a prior art drilled rimless frame, rear perspective view.

Of the 20,000 some frames shown, only about twelve indicate hinge barrels positioned downward of the frame's peripheral edge center (like FIG. 23 notations 62a and 63a, and FIG. 27 notations 62e and 63e). Most of the twelve are older, 1980's, frames.

Figure 24:
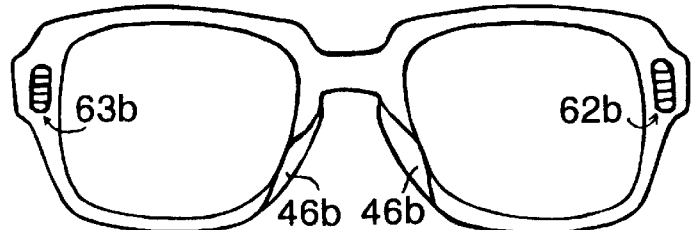
FIG. 24 is a prior art plastic frame with large nosepiece flanges, rear perspective view.
Figure 25:
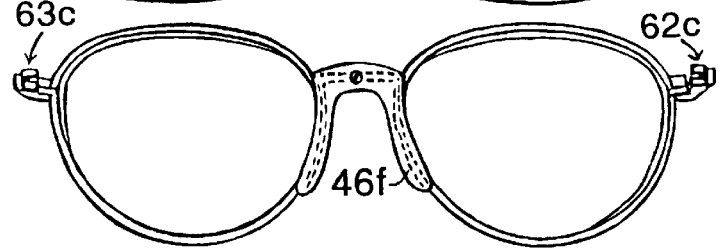
FIG. 25 is a prior art metal frame, rear perspective view.
Figure 26:
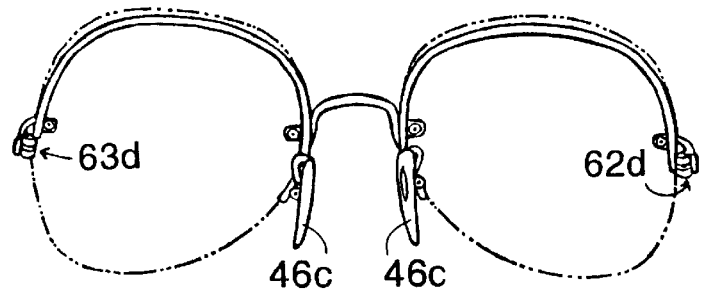
FIG. 26 is a prior art rimless frame, rear perspective view.

Most prior art's hinge barrels are at, or above, the midline of the eyeglass frame (like FIGS. 24–26 notations 62 and 63, b thru d). For an eyeglass frame with midline or above positioned hinge barrels, my sidepieces average at least 30 mm. longer than prior art temples. In example, a frame using 145 mm. temples could use my sidepieces of 175 mm in length. Temple, or sidepiece, length is measured along the inside surface of the hooks, or curves, as if the hooks or curves were straightened.

My sidepieces' ear-rests provide different shaped ear-pieces than prior art temples. FIG. 31 shows a sidepiece that looks similar to an upside down temple, if not for ear-rest nub 70b. This nub starts a separate curve so the ear-rest can contact the like curve of a lower rear ear slope. My system is based on the leveraging reaction of the wearer's lower rear ear slopes. Using upside down temple hooks, where the bend in the hooks would be positioned under the ear lobes, would provide straight surfaces against the round rear ear curves. This would not be as comfortable. An eyeglass support system using upside down temples may stay positioned on a wearer, but the excess pressure to the backs of the ears may promote the temples to slip downward off the ears.

11. Frames Verses Frames-plus-Lenses

Prior art frames support lenses around their edges. Because of this, the frame's weight center, front to rear, is approximately located at the frame-plus-lenses' weight center. Frames and lenses are often provided by different sources. Lense weight is variable and individualized, and would be impractical to claim. Because of all this, an eyeglass frame, with a rearward nosepiece, can provide the same utility as an eyeglass frame-plus-lenses, with a rearward nosepiece. Therein, my claims refer to a front eyeglass frame of a size and shape to fixedly support a pair of lenses.

12. Materials

A multitude of rigid to flexible materials may be used, including in combination, for all parts of various embodiments of my system. Materials that may be used include, but are not limited to, plastics, metals, polycarbonate, carbon fiber, and silicone.

13. Conclusion

My system is constructed to prevent slippage. It puts no pressure to a wearer's head. My system does not rely on unreliable friction, and put almost no pressure on the ears. My system stays in place on a wearer in any position. My system shows: less is more, or avoiding contact to the tops of the wearer's ears produces a better result.

My system simply and effectively lifts and supports eyeglasses on a wearer's nose. My sidepieces can be retrofitted to nearly all prior art frames to produce my eyeglasses utility.

Because the lower rear slopes of the wearer's ears steeply decline into the sensitive ear lobes, painless attachment to those slopes, without requiring contact to other areas of the ears, is not an obvious invention.

I claim:

1. An eyeglass support system comprising:

a front eyeglass frame of a size and shape to fixedly support a pair of lenses;

said frame having a centrally located nosepiece, positioned rearward of said frame;

said nosepiece being of a size and shape to be received onto both sides of a wearer's nose, said frame having opposite side edges, each said side edge having a first means for mounting a sidepiece;

a pair of elongated sidepieces, the frontward ends of each said sidepiece having a second means coupled to a corresponding said first means;

a pair of ear-rests, each said ear-rest being fixedly attached to the rearward end of a corresponding said sidepiece;

each said ear-rest being of a size and shape to only receive the lower rear slope of a corresponding wearer's ear; wherein each said sidepiece is mounted to said frame; and each said sidepiece is secured to said frame.

2. An eyeglass support system according to claim 1, wherein:

when worn, said frame is positioned in front of the wearer's eyes, said frame's nosepiece is received onto both sides of said wearer's nose, each said sidepiece is positioned laterally from the wearer's face, and each said ear-rest is received by a said lower rear slope of the corresponding wearer's ear.

3. An eyeglass support system according to claim 1, wherein:

said first means comprising first hinge barrels;

said second means comprising second hinge barrels, of a size and shape to mate with said first hinge barrels; and a hinge screw hingedly secures said first hinge barrels to said second hinge barrels.

4. An eyeglass support system, for supporting lenses substantially in front of a wearer's eyes, including a frame, a nosepiece, a pair of sidepieces, and a pair of ear-rests; such that when said system supports lenses:

said frame supporting a pair of lenses in front of the wearer's eyes;

one end of each said sidepiece is rearwardly attached to a corresponding one of the lateral opposite sides of said frame;

each said ear-rest is substantially rearwardly and upwardly attached to a corresponding one of the other end of said sidepiece for receiving the lower rear ear slope of the wearer; and said nosepiece is rearwardly centrally attached to said frame so that when worn by the wearer, said nosepiece is for supporting the weight of the system only on the wearer's nose and the ear-rests are held by the lower rear ear-slopes to counterbalance the eyeglass support system on the wearer's face.

5. An eyeglass support system according to claim 4, such that:

said sidepieces, in combination with said ear-rests positioned under said lower rear ear slopes, by length, weight, and lower rear ear reaction force, are for rearwardly counterbalancing, on said nose, the weight of said system that is forward of said nosepiece.

6. An eyeglass support system according to claim 4, such that:

said nosepiece, in combination with said ear-rests, are for confining said system against said nose, and said lower rear ear slopes, respectively, by way of frontward and rearward support of said system between said nosepiece and said ear-rests.

7. An eyeglass support system according to claim 4, wherein: said ear-rests are for receiving only said wearer's lower rear ear slopes.

8. A method of supporting eyeglasses on a wearer which comprises the steps of: leveraging eyeglasses only onto the wearer's nose; and confining said eyeglasses on the wearer's face against said wearer's nose and the wearer's lower rear ear slopes.

9. A method of supporting eyeglasses on a wearer, according to claim 8, which further comprises the steps of: supporting eyeglasses without laterally pressuring the wearer's head.

* * * * *